(No Model.) 3 Sheets—Sheet 1.

E. D. ROCKWELL.
BELL.

No. 471,982. Patented Mar. 29, 1892.

Witness
Louis F. Julihn.
Eric F. Julihn.

Inventor
E. D. Rockwell.
By Hopkins & Atkins
Attorneys (No Model.) 3 Sheets—Sheet 2.

E. D. ROCKWELL.
BELL.

No. 471,982. Patented Mar. 29, 1892.

Witness
Louis S. Julihn
Eric S. Julihn

Inventor
E. D. Rockwell.
By Hopkins & Atkins
Attorneys (No Model.) 3 Sheets—Sheet 3.

E. D. ROCKWELL.
BELL.

No. 471,982. Patented Mar. 29, 1892.

Witnesses
Louis G. Julihn
Eric G. Julihn

Inventor
E. D. Rockwell
By Hopkins & Atkins
Attorneys

UNITED STATES PATENT OFFICE.

EDWARD DAYTON ROCKWELL, OF BRISTOL, CONNECTICUT, ASSIGNOR TO THE NEW DEPARTURE BELL COMPANY, OF SAME PLACE.

BELL.

SPECIFICATION forming part of Letters Patent No. 471,982, dated March 29, 1892.

Application filed September 17, 1891. Serial No. 405,999. (No model.)

*To all whom it may concern:*

Be it known that I, EDWARD DAYTON ROCKWELL, of Bristol, county of Hartford, and State of Connecticut, have invented certain new and useful Improvements in Bells, of which the following is a specification, reference being had to the accompanying drawings.

The object of my invention is to produce a bicycle-bell that is compact, simple, strong, durable, and reliable and by which a sound resembling that of an electric bell, but of increased purity of tone, may be produced.

Figure 1:
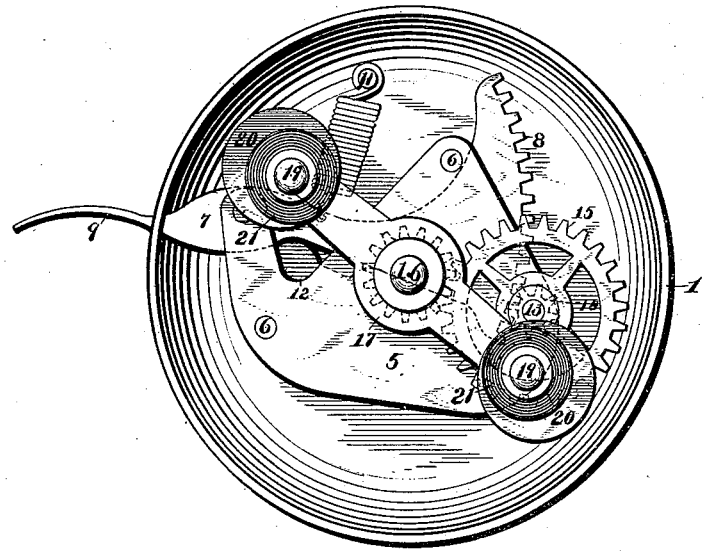
Figure 2:
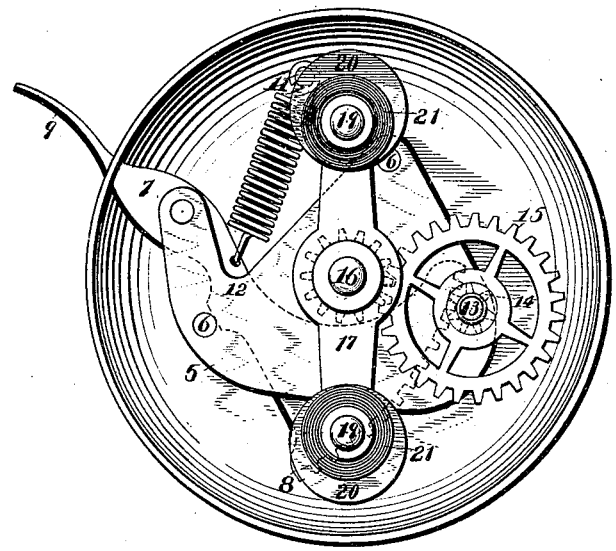
Figure 3:
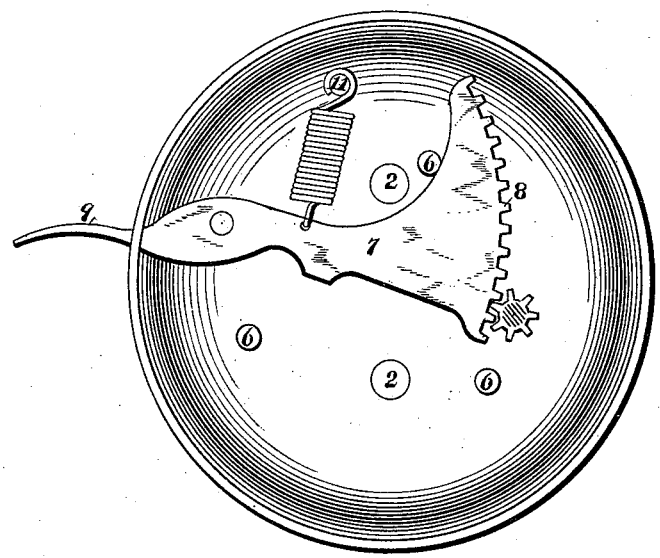
Figure 4:
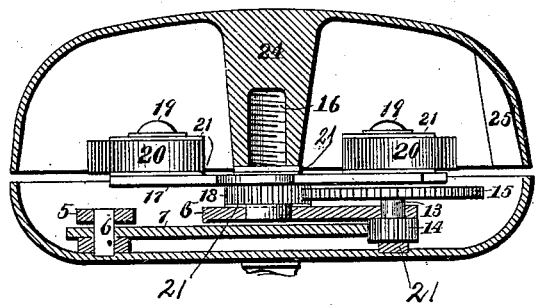
Figure 5:
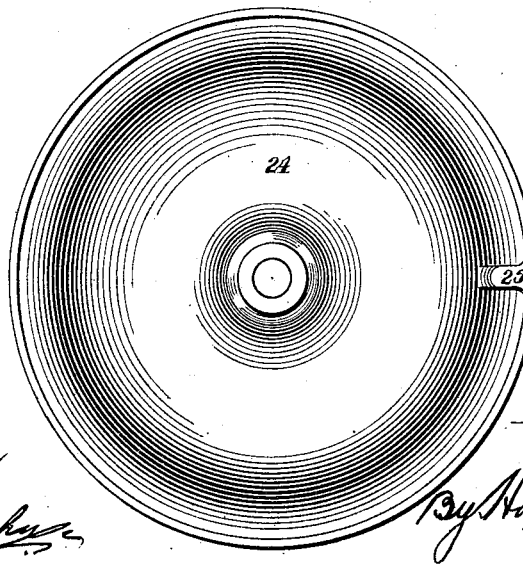
Figure 6:
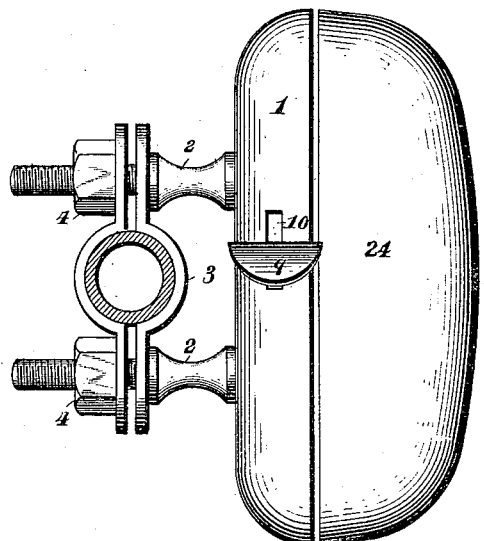
Figure 7:
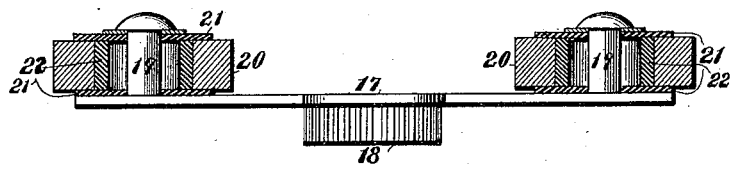
Figure 8:
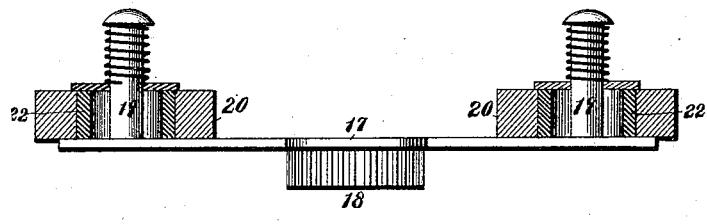

In the accompanying drawings, Figure 1 is a top plan view of my bell with the gong removed, showing the spring in the contracted position. Fig. 2 is a similar view showing the spring extended. Fig. 3 is a similar view with parts of the mechanism removed. Fig. 4 is a central vertical section of my bell complete. Fig. 5 is a view of the inside of the gong detached. Fig. 6 is a side elevation of my bell. Fig. 7 is a view of the striker-head with the strikers shown in cross-section. Fig. 8 is a similar view showing a modification of the means of securing the strikers noiselessly to the striker-head, in which a spring is employed around their pivot-pins to press them down and keep them from rattling.

Referring to the figures on the drawings, 1 indicates the base-plate of my bell, which may be provided with screw-threaded standards 2 and a split collar 3, through which by means of the nuts 4 it may be secured to the handle-bar of a bicycle. The edges of this base-plate are rounded, so as to give the base a dish shape and to impart beauty and symmetry to the bell; but its bottom part is flat.

5 indicates a top plate, that is carried upon the base-plate by means of studs 6, which may be riveted to the base and to the top plate. The base-plate and top plate constitute the frame of the bell mechanism. To one side, between the base-plate and the top plate, is pivoted a lever 7, that carries on one end a segmental gear 8 and on the other end a handle 9, that projects outwardly through a slot 10 in the side of the base-plate.

11 indicates a lug projecting inwardly from the base-plate, to which is secured at one end a tensile spring, that is fastened at the other end to the lever 7.

12 indicates a recess in the plate to allow free movement of the spring.

The movement of the lever may be limited by suitable means—as, for instance, the studs that connect the top plate to the base-plate. Upon the side of the base-plate opposite the handle 9 is pivoted an arbor 13, that carries between the base-plate and the plate a pinion 14 and on the outside of the top plate a gear 15.

16 indicates a central stud, that is screw-threaded on its end and is provided next the top plate with a smooth bearing for the revolving striker-bar 17, that is adapted to receive rotary motion from the gear 15 through the pinion 18, with which it meshes. The form of the striker-bar is immaterial, a revoluble head adapted to carry strikers being the essential characteristic. Upon opposite ends of the striker-bar are provided pins 19, that carry loosely-pivoted strikers 20, which are preferably of such shape as to be thrown by centrifugal force against the side of a gong and be whirled upon their pivots after each stroke, so as to present each time a new striking-face. In a bicycle-bell especially it is a desideratum to have the mechanism noiseless, so that the tone of the bell may be pure and clear. For that reason I provide noiseless washers 21 between the working parts, which otherwise would produce a rattling sound. These washers may be made of rubber, leather, fiber, or any suitable material.

Around the pivot-pins of the strikers I provide a noiseless bearing-piece 22—for instance, a section of rubber tubing or the like—so that the strikers are absolutely noiseless. In this manner I dispense with all disagreeable rattle or discordant sound in the mechanism for operating the bell. Upon the screw-threaded end of the stud 16, above a metallic washer 21, I screw the gong 24, which serves, also, to hold the revolving striker-bar in place. This gong is preferably provided on one side with a lug 25, against which the strikers impinge when the striker-bar is revolved, producing thereby a clear musical tone. By this means, also, I am able to make the gong large enough to be for all time out of reach of the strikers, even after their pivotal apertures have become, as they will in use, enlarged by friction, and thereby avoid liability of their touching the gong at more than one place and interfering with its sounding properly.

The following explanation, in conjunction with the foregoing description, will serve to explain the operation of my device: Hand-pressure upon the handle 9 will operate the lever 7 and through the train of gearing impart several revolutions to the striker-bar. When the handle is released, the spring will retract the lever to its first position and cause the striker-bar to revolve in the opposite direction. The revolution of the striker-bar will thus produce two distinct sets of sounds, each resembling the ringing of an electric bell.

I do not in this specification claim, in combination operatively with other parts of bell mechanism, a centrally-pivoted pinion loosely mounted on a central post on the frame and having an arm upon one side, because I have made it the subject-matter of another application, Serial No. 410,248, filed October 29, 1891.

What I claim is—

1. In a bell, the combination, with a striker and its pivot-pin and supporting part, of noiseless washers above and below the strikers and a noiseless bearing-piece around the pivot-pin, substantially as set forth.

2. The combination, with a base-plate, of a revoluble striker-bar spring-actuated in one direction, a lever operatively connected therewith and adapted to rotate the striker-bar in opposition to the force of the spring, and a gong, substantially as set forth.

In testimony of all which I have hereunto subscribed my name.

EDWARD DAYTON ROCKWELL.

Witnesses:
ETTA B. SPRING,
CHARLIE DOWNS.